US011799892B2

(12) United States Patent
Newman et al.

(10) Patent No.: US 11,799,892 B2
(45) Date of Patent: Oct. 24, 2023

(54) METHODS FOR PUBLIC CLOUD DATABASE ACTIVITY MONITORING AND DEVICES THEREOF

(71) Applicant: Cloud Storage Security, Pittsford, NY (US)

(72) Inventors: Aaron Newman, Pittsford, NY (US); Jason Ruckman, Rochester, NY (US); Angus Davis, Rochester, NY (US)

(73) Assignee: CLOUD STORAGE SECURITY, Pittsford, NY (US)

( * ) Notice: Subject to any disclaimer, the term of this patent is extended or adjusted under 35 U.S.C. 154(b) by 392 days.

(21) Appl. No.: 17/160,521

(22) Filed: Jan. 28, 2021

(65) Prior Publication Data
US 2022/0239681 A1 Jul. 28, 2022

(51) Int. Cl.
H04L 29/06 (2006.01)
H04L 9/40 (2022.01)
(Continued)

(52) U.S. Cl.
CPC ...... H04L 63/1425 (2013.01); G06F 9/45558 (2013.01); G06F 11/3006 (2013.01);
(Continued)

(58) Field of Classification Search
CPC ............. H04L 63/1425; H04L 63/0281; H04L 63/1408; G06F 9/45558; G06F 11/3006; G06F 11/3065; G06F 11/324; G06F 16/252; G06F 2009/45591; G06F 2201/80; G06F 11/327; G06F 11/301
See application file for complete search history.

(56) References Cited

U.S. PATENT DOCUMENTS

2014/0201838 A1* 7/2014 Varsanyi ............... G06F 21/552
726/23
2015/0242639 A1* 8/2015 Galil ...................... G06F 21/60
726/1
(Continued)

OTHER PUBLICATIONS

Kaur, Shabnam, and Rajandra Gupta. "Enhancing Features of Cloud Computing Using Cloud Access Security Brokers to Avoid Data Breaches." European Journal of Engineering and Technology Research 4.10 (2019): 185-189. (Year: 2019).*

Primary Examiner — Ka Shan Choy
(74) Attorney, Agent, or Firm — Troutman Pepper Hamilton Sanders LLP (Rochester)

(57) ABSTRACT

Methods, non-transitory computer readable media, and database activity monitor devices that deploy a monitoring proxy into a virtual private cloud (VPC) network hosted by a first public cloud network following detection in the VPC network of a new database associated with an entity. The monitoring proxy is configured to obtain and report the activity data based on a first database type of the cloud database. A determination is made when at least one security check defined in at least one security policy is violated based on an analysis of the activity data. An alert is automatically output via a communication network, when the determination indicates the security check is violated. One or more interactive dashboards are generated and output based on the activity data. The interactive dashboards comprise a historical database activity report for the entity.

24 Claims, 9 Drawing Sheets

(51) Int. Cl.
*G06F 9/455* (2018.01)
*G06F 16/25* (2019.01)
*G06F 11/30* (2006.01)
*G06F 11/32* (2006.01)

(52) U.S. Cl.
CPC ........ *G06F 11/3065* (2013.01); *G06F 11/324* (2013.01); *G06F 16/252* (2019.01); *G06F 2009/45591* (2013.01); *G06F 2201/80* (2013.01)

(56) References Cited

U.S. PATENT DOCUMENTS

| | | | |
|---|---|---|---|
| 2021/0099478 A1* | 4/2021 | Seetharamaiah | H04L 63/14 |
| 2022/0038428 A1* | 2/2022 | Rodniansky | G06N 5/022 |
| 2022/0291986 A1* | 9/2022 | Klein | G06F 3/0653 |

* cited by examiner

METHODS FOR PUBLIC CLOUD DATABASE ACTIVITY MONITORING AND DEVICES THEREOF

FIELD

This technology generally relates to database management and security and, more particularly, to methods and devices for database activity monitoring for public cloud databases.

BACKGROUND

Historically, a significant amount of information technology (IT) infrastructure has been built and managed in proprietary data centers, requiring individual entities to build and manage physical computers, storage devices, network devices, power sources, server rooms, cooling systems, and even fire suppression systems. Individual IT infrastructure deployment has resulted inefficiencies and fluctuations in the quality, robustness, and security of the various proprietary data centers. Accordingly, entities are increasingly utilizing public cloud infrastructure available from Amazon Web Services™, Microsoft Azure™, and Google Cloud Platform™, for example, which provide unlimited access to compute, network, and storage at a high level of quality, robustness, and security.

In a public cloud environment, an application programming interface (API) turns physical server devices into virtual devices that can be rented, and then unrented, in a matter of seconds. The shared data center infrastructure is geographically dispersed and created as "infinitely" scalable. Accordingly, public cloud providers have taken the complexity of physical security, fire suppression systems, power management, and many other resources and tasks out of the hands of the IT consumers. However, the migration of IT infrastructure out of the proprietary data centers and into the emerging public cloud environments requires new IT management strategies, particularly with respect to database security and monitoring.

For example, data that requires database security and monitoring includes sensitive data assets of an entity, such as credit card numbers, social security numbers, personally identifiable information (PII), health information, financial information, customer data, and trade secrets. Historically, this type of sensitive data for an entity was stored in proprietary data centers hosted by the entity. However, as entities increasingly taking advantage of the availability of databases in public cloud environments, which are ephemeral, dynamic, and quickly scalable up or down, new challenges are presented with respect to monitoring and security.

In particular, many entities now have complex public cloud deployments that include a large number of heterogeneous ephemeral databases spread across many accounts on different cloud platforms. With such a diverse and expansive data storage footprint, identifying security concerns, such as malicious or unauthorized activity by administrators or third parties, is challenging. Further, current database activity monitoring tools often require communication of activity data across wide area or public networks, which creates additional security concerns.

SUMMARY

A method for public cloud database activity monitoring is implemented by a database activity monitor (DAM) device and includes deploying a monitoring proxy into a virtual private cloud (VPC) network hosted by a first public cloud network following detection in the VPC network of a new public cloud database associated with an entity. The monitoring proxy is configured to obtain and report the activity data based on a first database type of the new database. A determination is made when at least one security check defined in at least one security policy is violated based on an analysis of the activity data. An alert is automatically output via a communication network, when the determination indicates the security check is violated. One or more interactive dashboards are then generated and output based on the normalized activity data. Based on the activity data monitored and over time, the interactive dashboards can advantageously comprise a historical database activity report for the entity.

A DAM device is disclosed that includes memory including programmed instructions stored thereon and one or more processors configured to execute the stored programmed instructions to deploy a monitoring proxy into a VPC network hosted by a first public cloud network following detection in the VPC network of a new database associated with an entity. The monitoring proxy is configured to obtain and report the activity data based on a first database type of the new database. A determination is made when at least one security check defined in at least one security policy is violated based on an analysis of the activity data. An alert is automatically output via a communication network, when the determination indicates the security check is violated. One or more interactive dashboards are then generated and output based on the normalized activity data. Based on the activity data monitored and over time, the interactive dashboards can advantageously comprise a historical database activity report for the entity.

A non-transitory computer readable medium is disclosed that has stored thereon instructions for public cloud database activity monitoring and includes executable code that, when executed by one or more processors, causes the processors to deploy a monitoring proxy into a VPC network hosted by a first public cloud network following detection in the VPC network of a new database associated with an entity. The monitoring proxy is configured to obtain and report the activity data based on a first database type of the new database. A determination is made when at least one security check defined in at least one security policy is violated based on an analysis of the activity data. An alert is automatically output via a communication network, when the determination indicates the security check is violated. One or more interactive dashboards are then generated and output based on the normalized activity data. Based on the activity data monitored and over time, the interactive dashboards can advantageously comprise a historical database activity report for the entity.

This technology has a number of advantages including methods, non-transitory computer readable media, and DAM devices that monitor activity (e.g., queries, connections, administrative actions, and internal processes) initiated against public cloud databases with an entity. This technology records and normalizes the associated activity data, analyzes the normalized activity data for security violations, automatically initiates alerts regarding the security violations, and reports the normalized activity data via interactive dashboards.

Examples of this technology provide automated alerts and interactive dashboards that allow administrators to not only view historical activity data, including for ephemeral, dynamic, and heterogeneous public cloud database deployments, but also to interact and take any necessary corrective or preventative actions. Additionally, activity data is advantageously obtained by monitoring proxies deployed within VPC networks that host the monitored databases to reduce exposure of the databases to security threats.

DETAILED DESCRIPTION

Figure 1:
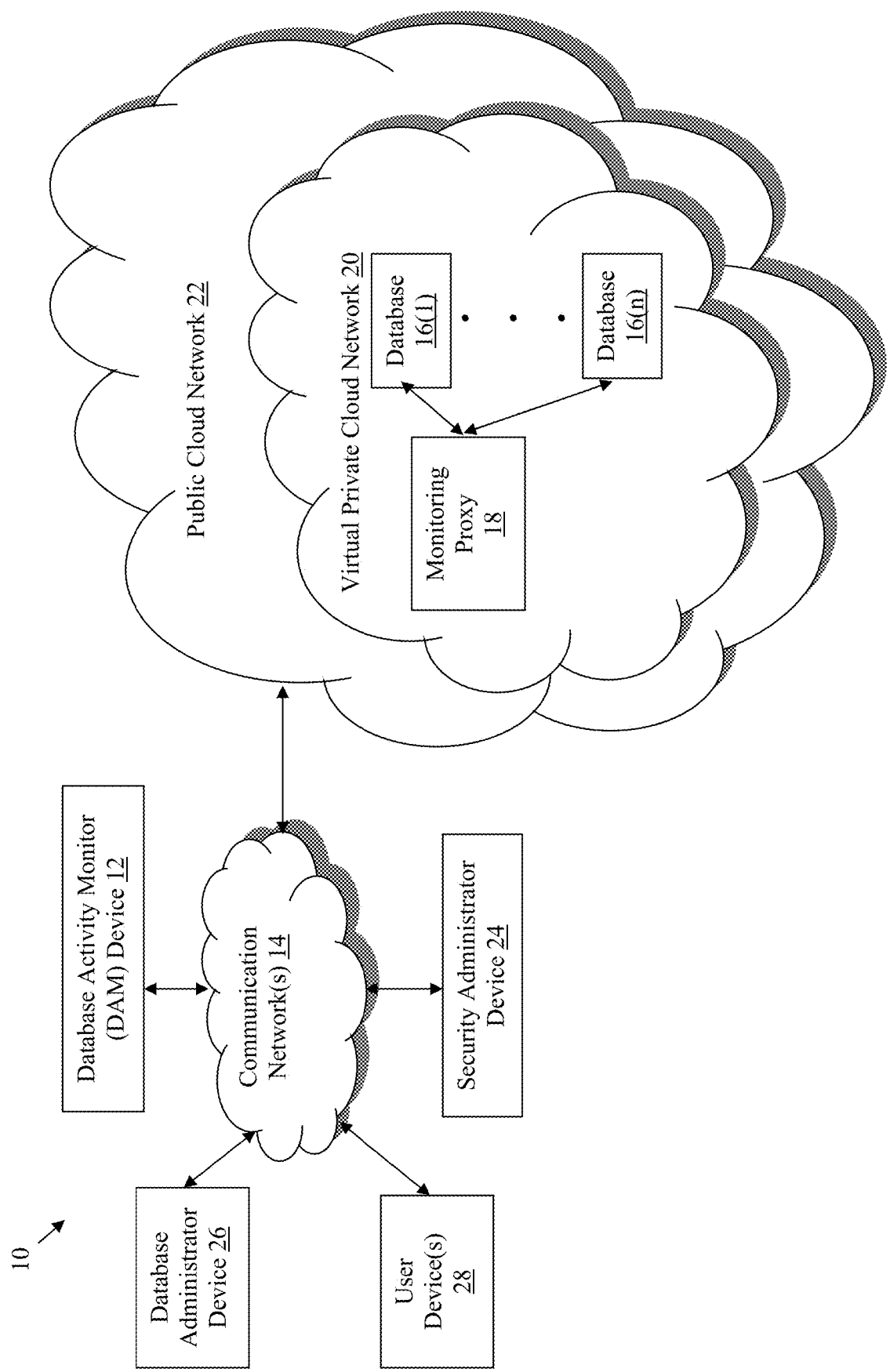
FIG. 1 is a block diagram of an exemplary network system with a database activity monitor (DAM) device.

Referring to FIG. 1, an exemplary network system 10 is illustrated. The network system 10 in this example includes a database activity monitor (DAM) device 12 that is coupled, via communication network(s) 14, to databases 16(1)-16(n) via a monitoring proxy 18 hosted by a virtual private cloud (VPC) network 20 within a public cloud network 22. The DAM device 12 is also coupled, via the communication network(s) 14, to a security administrator device 24. The databases 16(1)-16(n) are also coupled to a database administrator device 26 and user device(s) 28 via the VPC network 20, public cloud network 22, and the communication network(s) 14. The network system 10 also may include other network devices such as routers or switches, for example, which are known in the art and thus will not be described herein. This technology provides a number of advantages including database activity monitoring for heterogeneous public cloud databases to facilitate improved security, alerting, and historical reporting.

In this example, the DAM device 12 is a dedicated hardware device, but can also be implemented in software within one or more other devices in other examples. For example, the DAM device 12 can be hosted by the security administrator device 24 or a server device (not shown) in the public cloud network 22, and other network configurations can also be used. Accordingly, the DAM device 12 can be utilized via an application programming interface (API) in a software as a service (SaaS) deployment, and other types of deployments can also be used.

Figure 2:
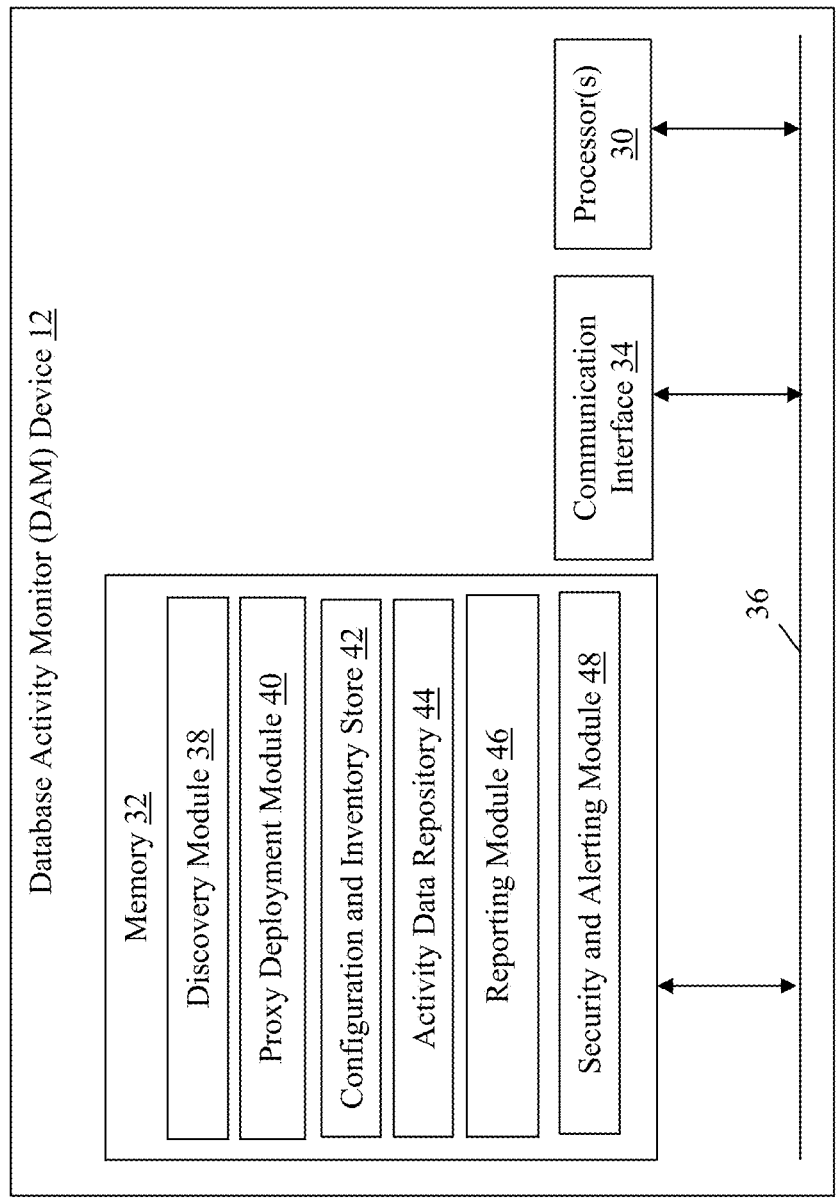
FIG. 2 is a block diagram of an exemplary DAM device.

Referring to FIGS. 1-2, the DAM device 12 in this example includes processor(s) 30, memory 32, and a communication interface 34, which are coupled together by a bus 36, although the DAM device 12 can include other types or numbers of elements in other configurations. The processor(s) 30 may execute programmed instructions stored in the memory 32 for any number of functions described and illustrated herein. The processor(s) 30 may include one or more central processing units (CPUs) or general purpose processors with one or more processing cores, for example, although other types of processor(s) can also be used.

The memory 32 of the DAM device 12 stores these programmed instructions for aspect(s) of the present technology as described and illustrated herein, although some or all of the programmed instructions could be stored elsewhere. A variety of different types of memory storage devices, such as random access memory (RAM), read only memory (ROM), hard disk, solid state drives (SSD), flash memory, or other computer readable medium which is read from and written to by a magnetic, optical, or other reading and writing system that is coupled to the processor(s) 30, can be used for the memory 32.

The memory 32 of the DAM device 12 can store module(s) that can include computer executable instructions that, when executed by the processor(s) 30, cause the processor(s) 30 to perform actions, such as to transmit, receive, and/or otherwise process network messages, for example, and to perform other actions described and illustrated below with reference to FIGS. 3-6. The modules can be implemented as components of other modules, applications, operating system extensions, and/or plugins, for example.

Further, one or more of the modules may be operative in a cloud-based computing environment (e.g., within the public cloud network 22). One or more of the modules can be executed within or as virtual machine(s) or virtual server(s) that may be managed in a cloud-based computing environment. Also, one or more of the modules, and even the DAM device 12 itself, may be located in virtual server(s) running in a cloud-based computing environment rather than being tied to specific physical network computing device(s). Also, one or more of the modules may be running in one or more virtual machines (VMs) executing on the DAM device 12 and managed or supervised by a hypervisor.

In this particular example, the memory 32 includes a discovery module 38, a proxy deployment module 40, a configuration and inventory store 42, an activity data repository 44, a reporting module 46, and a security and alerting module 48, although other types of modules can also be provided in other examples. The discovery module 38 in this example is configured to automatically discover databases (e.g., databases 16(1)-16(n)) from one or more public cloud systems (e.g., the public cloud network 22). The discovery module 38 utilizes access data associated with an obtained list of public cloud accounts for an entity and queries each public cloud account using published cloud APIs to retrieve a list of database management systems from each public cloud account.

Accordingly, the discovery module 38 retrieves a complete list of all databases 16(1)-16(n) for an entity by searching for database management systems for any number of database types, each of which generally requires a different API to enumerate. The complete list of databases 16(1)-16(n) is comprehensive with respect to any number of public cloud accounts across any number of public cloud providers or platforms, and is used to store an inventory including an entry with a unique identifier in the configuration and inventory store 42 for each of the discovered databases 16(1)-16(n) to thereby provide a holistic view of the databases 16(1)-16(n) associated with an entity.

The discovery module 38 can execute periodically or on an ad-hoc basis to maintain a database inventory in the configuration and inventory store 42, which can be used to review how the databases 16(1)-16(n) were configured and secured over historical periods of time, and to automatically discover one of the databases 16(1)-16(n) when it comes online. The discovery module 38 in some examples utilizes the public cloud APIs to obtain configuration data for each of the discovered databases 16(1)-16(n).

The configuration data can be maintained in the configuration and inventory store 42 and can include information regarding security settings and permissions, for example, that can be used by the security and alerting module 48. The operation of an exemplary discovery module 38 is described and illustrated in more detail in U.S. patent application Ser. No. 16/995,889, filed Aug. 18, 2020 and entitled "METHODS FOR INVENTORYING AND SECURING PUBLIC CLOUD DATABASES AND DEVICES THEREOF," which is incorporated by reference herein in its entirety. Other methods for discovering and/or inventorying the databases 16(1)-16(n) can also be used in other examples.

The proxy deployment module 40 is configured to instantiate the monitoring proxy 18 into the VPC network 20 that is configured to obtain, and report to the DAM device 12, activity data associated with the databases 16(1)-16(n). The activity data relates to various interactions with the databases 16(1)-16(n) that are observed by the monitoring proxy 18, or identified in logs interpreted and/or provided by the monitoring proxy 18, as described and illustrated in more detail later. The DAM device 12 maintains the activity data in the activity data repository 44 in this example, which can be any type of database or other data structure.

The monitoring proxy 18 in this example is lightweight and deployed by the DAM device 12 within each VPC network (e.g., VPC network 20) hosting a database (e.g., databases 16(1)-16(n)). The deployment can be automatically facilitated by the DAM device 12 using cloud templates (e.g., Cloud Formation Templates are one example in which the monitoring proxy 18 is deployed into the public cloud network 22 hosted by Amazon Web Services™). The cloud templates contain instructions on how to run within the VPC network 20, create network security groups required to communicate with the DAM device 12, and create instance(s) and/or virtual server(s) to host the monitoring proxy 18. The operation of the proxy deployment module 40 is described and illustrated in more detail below with reference to step 304 of FIG. 3, for example. Additionally, the monitoring proxy 18 can also be deployed by the proxy deployment module 40 in other ways in other examples.

The reporting module 46 is configured to generate interactive graphical user interface (GUI) dashboards that allow a security administrator using the security administrator device 24 to view, query, sort, and/or filter contents of the activity data repository 44, for example. The interactive dashboards can provide details regarding the activity associated with the databases 16(1)-16(n), along with other databases (not shown), including historical and ephemeral databases that do not exist at the time that the interactive dashboard is generated, associated with a same entity, which may be in other VPC networks in the same or other public cloud networks. The operation of the reporting module 46 is described and illustrated in more detail below with reference to steps 318-320 of FIG. 3 and FIGS. 4A-4D, for example.

The security and alerting module 48 in this example ingests activity data reported from the monitoring proxy 18, stores the ingested activity data in the activity data repository 44 in a normalized format, and applies security policies to the activity data to generate security result data, which is stored in the configuration and inventory store 42 and/or activity data repository 44. The security and alerting module 48 analyzes the contents of the activity data repository 44, and/or the activity data upon ingestion from the monitoring proxy 18, to determine whether a rule has been satisfied requiring an alert or notification to an administrator. In other examples, the monitoring proxy 18 can be configured to apply security policies to identify violation of a rule and can further communicate the violation to the DAM device 12 and/or initiate an alert directly.

The rules can be included in the security policies and can define security checks relating to malicious or unauthorized activity initiated against one or more of the databases 16(1)-16(n). The security policies can define which of the security checks are executed against the inventoried databases 16(1)-16(n), and include the parameter(s) to qualify the check(s). The results of the security checks are stored in a format that facilitates tracking over time, including when the associated activity occurred, the type of activity, user information for the source of the activity, and other parameters relating to the activity, for example.

Exemplary security checks defined within the security policies can analyze whether an unauthorized user attempted to change permissions associated with one of the databases 16(1)-16(n) or whether any user attempted to delete a particular database table, and many other types of rules and security checks can be used in other examples. In some examples, some of the security checks are specific to a particular database type and other of the security checks are generic to many database types, but may include different implementation logic for one or more database types.

Additionally, the security and alerting module 48 can facilitate generation, and incorporation into one or more of the security policies, of custom security checks that can have implementation logic and/or structured query language (SQL) statements that are specific to an environment or security requirements, for example. The security result data can include an indication of the check(s) that failed for one or more of the databases 16(1)-16(n), which can be used for reporting and can then be addressed by administrators to improve database security. The operation of the security and alerting module 48 is described and illustrated in more detail later with reference to steps 314-316 of FIG. 3.

The communication interface 34 of the DAM device 12 operatively couples and communicates between at least the DAM device 12, monitoring proxy 18, and security administrator device 24, which are coupled together at least in part by the communication network(s) 14 and VPC network 20 hosted by the public cloud network 22, although other types and/or another number of communication networks and/or systems with other types and/or another number of connections and/or configurations to other devices and/or elements can also be used.

By way of example only, the communication network(s) 14 can include local area network(s) (LAN(s)) or wide area network(s) (WAN(s)) and the public cloud network 22 can include a WAN (e.g., the Internet). The communication network(s) 14 and/or the public cloud network 22 can use TCP/IP over Ethernet and industry-standard protocols, although other types or numbers of protocols or communication networks can be used. The communication network(s) 14 and/or public cloud network 22 in this example can employ any suitable interface mechanisms and network communication technologies including, for example, Ethernet-based Packet Data Networks (PDNs) and the like.

While the DAM device 12 is illustrated in this example as including a single device, the DAM device 12 in other examples can include a plurality of devices each having one or more processors (each processor with one or more processing cores) that implement one or more steps of this technology. Additionally, one or more of the devices that together comprise the DAM device 12 in other examples can be standalone devices or integrated with one or more other devices or apparatuses. Moreover, one or more of the devices of the DAM device 12 in these examples can be in a same or a different communication network.

The monitoring proxy 18 of the network system 10 can be hosted by one or more server devices (not shown) within the VPC network 20 of the public cloud network 22. In one example, the monitoring proxy 18 and is configured to intercept and proxy communications (e.g., HTTPS calls) to a cloud provider address for a host of databases 16(1)-16(n) that are of a first type (e.g., Amazon DynamoDB™) and extract or generate activity data based on the communications. In another example, the monitoring proxy 18 is configured to intercept and proxy communications (e.g., API calls) that are made directly to the databases 16(1)-16(n) that are of a second type (e.g., Amazon Keyspaces™ (for Apache Cassandra™), Elasticsearch Service™, and DocumentDB™) and extract or generate activity data based on the communications.

In yet another examples, the monitoring proxy 18 is configured to retrieve or analyze audit or other logs that are maintained by the databases 16(1)-16(n) that are of a third type (e.g., Amazon Relational Database Service (RDS)™) to extract or generate activity data. The logs can be retrieved or accessed via an API of the cloud provider associated with the public cloud network 22, for example. Accordingly, the monitoring proxy 18 can be configured to obtain activity data based on a type of one or more of the databases 16(1)-16(n). The monitoring proxy 18 is further configured to report the activity data to the DAM device 12 via the communication network(s) 14 and based on relatively limited and/or highly-controlled egress networking rules that allow only small pipe(s) to a secure destination associated with the DAM device 12 (e.g., the security and alerting module 48).

The databases 16(1)-16(n) of the network system 10 may store data in a raw, compressed, encrypted, and/or deduplicated format, and can be hosted by one or more server devices (not shown) within the VPC network 20 of the public cloud network 22. The databases 16(1)-16(n) can be relational databases and/or one or more of the databases 16(1)-16(n) can be another types of database system including a relational database management system (RDBMS), a No-SQL database, an in-memory database, a data warehouses, or any other type of data store.

The databases 16(1)-16(n) can be provisioned and configured by a database administrator using the database administrator device 26 and an API provided by the public cloud network 22, for example. The database administrator device 26 in this example includes processor(s), memory, and a communication interface, which are coupled together by a bus or other communication link, although other numbers or types of components could be used. The database administrator device 26 may run interface application(s), such as standard web browsers or standalone client application(s) that facilitate use of the API provided by the public cloud network 22. The database administrator device 26 also may include a display device, such as a display screen or touchscreen, and/or an input device, such as a keyboard, for example.

The databases 16(1)-16(n) are used by the user device(s) 28 to store and/or retrieve data stored therein. Accordingly, the user device(s) 28 can include any type of computing device that can exchange network data, such as mobile, desktop, laptop, or tablet computing devices, virtual machines (including cloud-based computers), application server devices, and the like. Each of the user device(s) 28 includes processor(s), memory, and a communication interface, which are coupled together by a bus or other communication link, although other types and/or another number of components could also be used. The user device(s) 28 may run interface application(s), such as standard web browser(s) or standalone client application(s) that provide an interface to make requests for, and receive content stored on, the databases 16(1)-16(n). The user device(s) 28 may further include a display device, such as a display screen or touchscreen, and/or an input device, such as a keyboard for example.

The security administrator device 24 of the network system 10 is configured to interface with the DAM device 12 to provide access data (e.g., cloud account credentials), establish one or more of the security policies, and/or generate and consume reports regarding the databases 16(1)-16(n). Accordingly, the security administrator device 24 includes processor(s), memory, and a communication interface, which are coupled together by a bus or other communication link, although other numbers or types of components could be used. The security administrator device 24 may run interface application(s), such as standard web browsers or standalone client application(s) that facilitate use of API(s) provided, and access to report generated, by the DAM device 12. The security administrator device 24 also may include a display device, such as a display screen or touchscreen, and/or an input device, such as a keyboard, for example.

Although the exemplary network system 10 with the DAM device 12, databases 16(1)-16(n), monitoring proxy 18, security administrator device 24, database administrator device 26, VPC network 20, public cloud network 22, user device(s) 28, and communication network(s) 14 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network system 10, such as the DAM device 12, databases 16(1)-16(n), monitoring proxy 18, security administrator device 24, database administrator device 26, or user devices 28, for example, may be configured to operate as virtual instances on the same physical machine. In other words, one or more of the DAM device 12, databases 16(1)-16(n), monitoring proxy 18, security administrator device 24, database administrator device 26, or user device(s) 28 may operate on the same physical device rather than as separate devices communicating through communication network(s) 14, public cloud network 22, and/or VPC network 20.

Additionally, there may be more or fewer DAM devices, databases, proxies, security administrator devices, database administrator devices, or user devices than illustrated in FIG. 1. In particular, the VPC network 20 can include any number of databases, the public cloud network 22 can include any number of VPC networks each including a set of database(s) having associated monitoring proxies, and any number of public cloud networks associated with other platform hosts or providers can be coupled to the DAM device 12 via the communication network(s) 14. Accordingly, the particular topology illustrated in FIG. 1 is included merely to facilitate the description herein of some exemplary implementations of this technology.

The examples also may be embodied as one or more non-transitory computer readable media, such as the memory 32 of the DAM device 12, having instructions stored thereon for aspect(s) of the present technology, as described and illustrated by way of the examples herein. The instructions in some examples include executable code that, when executed by one or more processors, such as the processor(s) 30 of the DAM device 12, cause the processors to carry out steps necessary to implement the methods of the examples of this technology that are described and illustrated herein.

Figure 3:
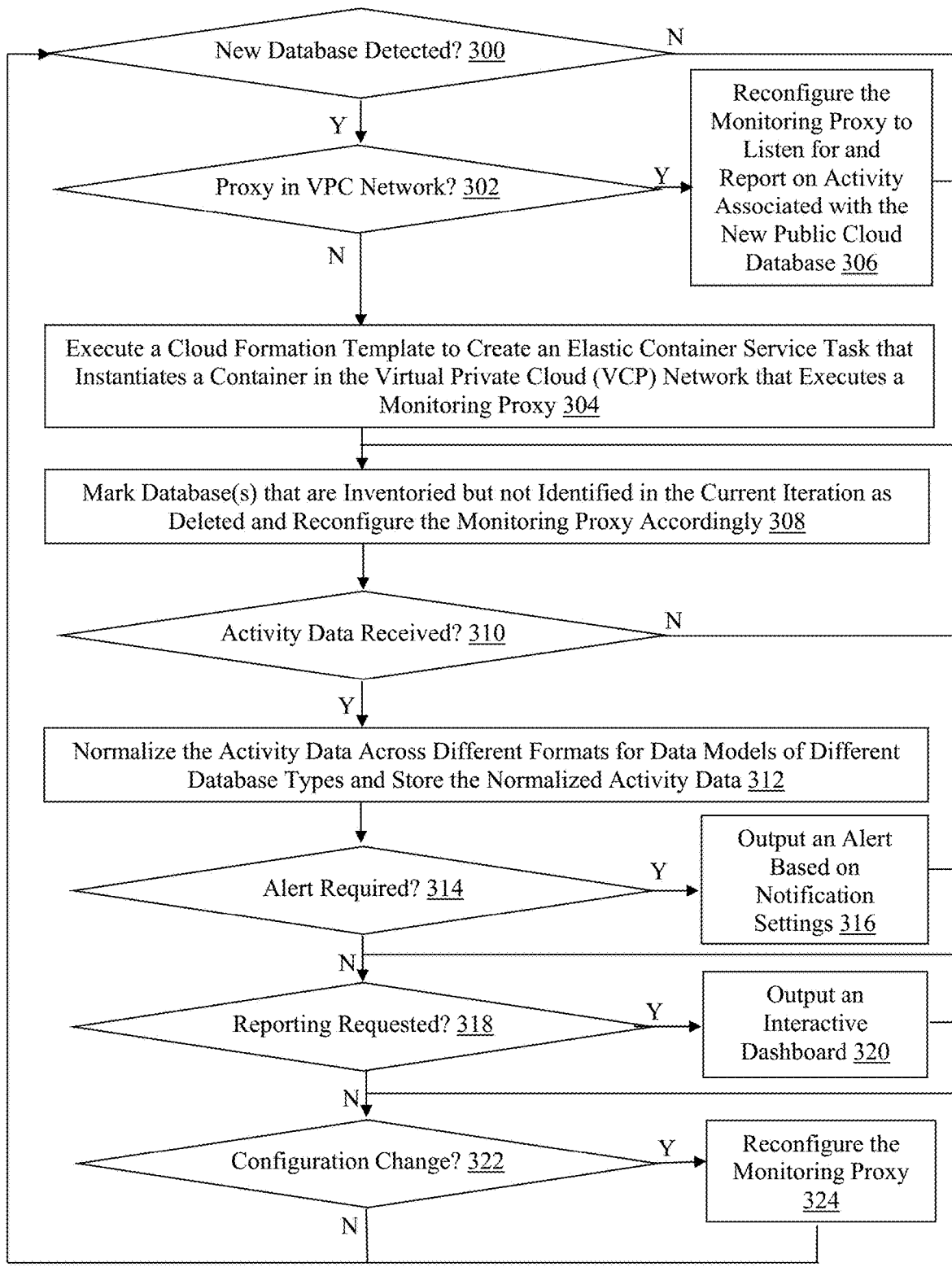
FIG. 3 is a flowchart of an exemplary method for public cloud database activity data ingestion, reporting, and alerting by a DAM device in a software-as-a-service (SaaS) deployment.

An exemplary method of public cloud database activity monitoring will now be described with reference to FIGS. 1-6. Referring more specifically to FIG. 3, an example of a method of public cloud database activity data ingestion, reporting, and alerting by the DAM device 12 in a SaaS deployment is illustrated. In step 300 in this example, the DAM device 12 determines whether a new one of the databases 16(1)-16(n) is detected in a current iteration of an inventorying process carried out by the discovery module 38, as described and illustrated in more detail above.

In some examples, the DAM device 12 obtains and stores access data for cloud account(s) associated with the databases 16(1)-16(n) for a particular entity. The access data can include credentials, passwords, access keys, cross-account roles, and/or authentication data, although other types of data facilitating access to the public cloud accounts, and/or other information, can also be included in the access data. In one example, the access data can be obtained from the security administrator device 24 via a submitted file or a provided user interface, for example. The DAM device 12 uses the access data in these examples to access and query a cloud account associated with the public cloud network 22, using an API provided by a host of the public cloud network 22, to obtain identification and other information regarding the VPC network 20 and databases 16(1)-16(n) associated with the cloud account.

In a first iteration, the DAM device 12 will determine based on the query that the VPC network 20 is new with respect to the associated cloud account, and therefore databases 16(1)-16(n) within the VPC network 20 also are new. Optionally, in subsequent iterations, the DAM device 12 determines whether one of the databases 16(1)-16(n) is already inventoried in the configuration and inventory store 42 based on a match of a unique identifier for the one of the databases 16(1)-16(n) or any other unique characteristic maintained in the configuration and inventory store 42 as a result of a prior inventorying operation, although the determination can be made based on other information in other examples.

In some examples, the DAM device 16 further determines in step 300 whether a new one of the databases 16(1)-16(n) qualifies for activity monitoring based on a tag or other characteristic associated with the database indicating that the database should be monitored with respect to associated activity. The tag can be introduced by an administrator using the database administrator device 26 upon instantiation of the one of the databases 16(1)-16(n), for example, and can include an explicit indication in configuration data associated with the one of the databases 16(1)-16(n) that activity for the new one of the databases 16(1)-16(n) should be monitored.

In another example, the tag is implicit based on an analysis by the DAM device 12 (or the monitoring proxy 18) of characteristics of the new one of the databases 16(1)-16(n). For example, the DAM device 12 can use an API provided by the host of the public cloud network 22 to determine that a table in the one of the databases 16(1)-16(n) is labeled to indicate that it holds credit card or other personally identifiable or sensitive information. Based on the characteristic that the new one of the databases 16(1)-16(n) is used to store sensitive information, the DAM device 12 determines that activity monitoring should be initiated for the one of the databases 16(1)-16(n), and the condition in step 300 is satisfied in this example.

Accordingly, qualification for database monitoring can be defined based on a policy including rule(s) applicable to tags or other characteristics associated with the databases 16(1)-16(n) in some examples. Other methods and criteria for qualifying a newly-detected database for activity monitoring can also be used in other examples. If the DAM device 12 determines that a new one of the databases 16(1)-16(n), optionally satisfying particular conditions for activity monitoring, is detected, then the Yes branch is taken to step 302.

In step 302, the DAM device 12 determines whether the monitoring proxy 18 has previously been deployed into the VPC network 20 associated with the new one of the databases 16(1)-16(n). The determination in step 302 can be based on a unique indication for the VPC network 20 maintained in the configuration and inventory store 42 as a result of a prior inventorying process, for example. If the VPC network 20 is identified in the configuration and inventory store 42, then a monitoring proxy 18 has been previously deployed. In a first iteration, the DAM device 12 will determine that the monitoring proxy 18 has not previously been deployed into the VPC network 20, and therefore the No branch will be taken to step 304.

In step 304, the DAM device 12 can insert identifying information for the VPC network 20 and/or new one of the databases 16(1)-16(n) into the configuration and inventory store 42 and automatically deploy the monitoring proxy 18. The DAM device 12 can execute a cloud formation template or an automated script, for example, to create an elastic container service task that instantiates a container in the VPC network 20 that executes the monitoring proxy 18. Other methods for deploying the monitoring proxy 18 also can be used in other examples. Referring back to step 302, if the DAM device 12 determines in a subsequent iteration that the monitoring proxy 18 has previously been deployed into the VPC network 20 associated with a new one of the databases 16(1)-16(n), then the Yes branch is taken to step 306.

In step 306, the DAM device 12 reconfigures the monitoring proxy 18 to listen for and/or report on activity associated with the new one of the databases 16(1)-16(n) identified in step 300. For example, the DAM device 12 can communicate a unique identifier of the new one of the databases 16(1)-16(n) to the monitoring proxy 18 with an instruction to monitor transmission control protocol (TCP) and/or other types of communications, and/or retrieve logs maintained for the new one of the databases 16(1)-16(n), to report on activity associated with the new one of the databases 16(1)-16(n), as described and illustrated in more detail below.

Accordingly, the DAM device 12 can provide configuration data to the monitoring proxy 18 following execution and registration of the monitoring proxy 18. The configuration data defines an operational configuration of the monitoring proxy 18 including parameters of the activity data to be obtained and reported, also as described and illustrated in more detail below with reference to FIG. 6, for example. Subsequent to step 306, step 304, or if a new one of the databases 16(1)-16(n) satisfying criteria for activity monitoring is not detected in a current iteration and the No branch is taken from step 300, then the DAM device 12 proceeds to step 308.

In step 308, the DAM device 12 identifies any of the databases 16(1)-16(n) that has an entry in the configuration and inventory store 42 but has not been identified as in existence in the current iteration. If one or more of the databases 16(1)-16(n) were previously inventoried in a prior iteration, but are not identified in the current iteration, then those one or more of the databases 16(1)-16(n) were deleted subsequent to the prior iteration. Since those one or more of the databases 16(1)-16(n) have been deleted, the DAM device 12 marks those previously inventoried and now deleted one or more of the databases 16(1)-16(n) as deleted, optionally with a timestamp, in the corresponding entries in the configuration and inventory store 42. Additionally, the DAM device 12 can reconfigure the monitoring proxy 18 by communicating an updated listing of the databases 16(1)-16(n) for which activity should be monitored, which excludes those one or more of the databases 16(1)-16(n) that are determined to have been deleted.

In step 310, the DAM device 12 determines whether activity data for one or more of the databases 16(1)-16(n) has been received as reported by the monitoring proxy 18. The activity data could have been reported by the monitoring proxy 18 as described and illustrated in more detail below with reference to step 608 of FIG. 6, for example. If the DAM device 12 determines that activity data has been received, then the Yes branch is taken to step 312.

In step 312, the DAM device 12 normalizes the activity data that may be across different formats for different data models of different database types according to the storage topology of a particular entity that may include the databases 16(1)-16(n) along with other database(s) of different types and/or data models in other VPC network(s) and/or public cloud network(s). Accordingly, in this example, the normalized activity data is stored into the activity data repository 44 in a format that supports multiple data models for different databases associated with a same entity.

In one example, the activity data repository 44 can be located external to the DAM device 12 and can be an Amazon Simple Storage Service™ (S3) bucket, although other types of warehouses can also be used and the activity data repository 44 can also be maintained in the memory 32 as illustrated in FIG. 2 in other examples. In some examples, the activity data repository 44 can be based on a table format where each of the data models are included in corresponding rows with a key utilized for each of the different data models and particular file formats used for one or more of the columns. Other methods of normalizing and/or storing the activity data can also be used. The normalized activity data can then be used for alerting and reporting, among other actions, as described and illustrated in more detail below.

In step 314, the DAM device 12 determines whether an alert is required based on an analysis of the activity data maintained in the activity data repository 44 against one or more predefined security policies established by an administrator via the security administrator device 24, for example. While the security is analyzed whenever new activity data is received in the example of this technology described and illustrated with reference to FIG. 3, in other examples, the security can be analyzed asynchronously, on an ad-hoc basis, and/or at other times. Additionally, the security can be analyzed with respect to the most recently-received activity data and/or the historical activity data maintained in the activity data repository 44 for the databases 16(1)-16(n).

The security policies applied in step 314 to determine whether an alert is required each include one or more security checks having one or more associated rules and one or more of the security policies can be custom, generic, and/or applicable only to a particular subset of the databases 16(1)-16(n) (e.g., one or more particular database type(s)), optionally based on the tags or other database characteristics discussed in more detail above. For example, a security check can determine whether a user of one of the user device(s) 28 attempted to access or delete a particular table storing sensitive information in one of the databases 16(1)-16(n) without permission to do so.

In another example, a security check can analyze whether a user of the database administrator device 26 attempted to change the permissions for one of the databases 16(1)-16(n) to allow access by an unauthorized user despite not having the permissions to do so. In examples, the security checks can merely flag an activity as a potential security breach requiring manual review or identify security breaches according to the parameters of the associated security policy, and other types of security checks and policies can be used in other examples.

Accordingly, the DAM device 12 identifies those of the database(s) 16(1)-16(n) to which the security policies are to be applied and applies the identified security policies to the associated activity data to generate security result data, which can include an indication of any security check(s) of the security policies that failed for one or more of the databases 16(1)-16(n) along with context information regarding the failure (e.g., user identity, user permissions, type of action that violated the security check, target database object or table, and/or time of associated activity). Failure of any particular security check(s) can cause the DAM device 12 to generate an alert message. If the DAM device 12 determines in step 314 that an alert is required, then the Yes branch is taken to step 316.

In step 316, the DAM device 12 outputs an alert based on notification stored settings obtained from a user of the security administrator device 24, for example. The notifications settings can specify the type of alert(s) (e.g., e-mail or short message service (SMS) message), the destination of the notification(s) (e.g., an administrator(s) of one or more of the databases(s) 16(1)-16(n) that triggered the alert(s), and/or the content of the alert(s) (e.g., the security check(s) that failed, as included in the security result data), among other information. After step 316, if the DAM device 12 determines in step 310 that activity data is not received and the No branch is taken from step 310, or if the DAM device 12 determines in step 314 that an alert is not required and the No branch is taken from step 314, the DAM device 12 proceeds to step 318.

In step 318, the DAM device 12 determines whether reporting of the inventory, state, activity, and/or security posture of one or more of the databases 16(1)-16(n), for example, has been initiated, such as by a user of the security administrator device 24 or based on an automated and/or periodic trigger, for example, although other methods of initiating a reporting can also be used in other examples. If the DAM device 12 determines that reporting has been initiated, then the Yes branch is taken to step 320.

In step 320, the DAM device 12 generates and outputs an interactive dashboard based at least in part on the stored activity data for the databases 16(1)-16(n) and optionally to the security administrator device 24. The interactive dashboard can facilitate searching, sorting, querying, filtering, and any other interaction with the activity data to allow an administrator of the infrastructure associated with the databases 16(1)-16(n) to obtain a holistic current and/or historical view of the activity associated databases 16(1)-16(n), or a subset thereof existing at any particular point in time. Optionally, the interactive dashboard can highlight or otherwise identify any of the databases 16(1)-16(n) for which the corresponding security result data indicates a failure of one or more security checks of one or more security policies to allow an administrator to quickly identify security breaches that may need to be addressed.

Referring more specifically to FIGS. 4A-4D, screenshots of exemplary interactive dashboards configured to provide normalized and processed activity data across heterogeneous public cloud databases for an entity are illustrated. The interactive dashboard 400A illustrated in FIG. 4A includes a histogram 402 of the activity occurring with respect to all databases 16(1)-16(n) and the corresponding type of activity (e.g., modify, insert, remove, and query). In an activity breakdown 404, more granular information regarding activities extracted from the activity data is provided on the interactive dashboard 400A.

Figure 4A:
FIGS. 4A, 4B, 4C, and 4D are screenshots of exemplary interactive dashboards configured to provide normalized and processed activity data across heterogeneous public cloud databases for an entity.
Figure 4B:
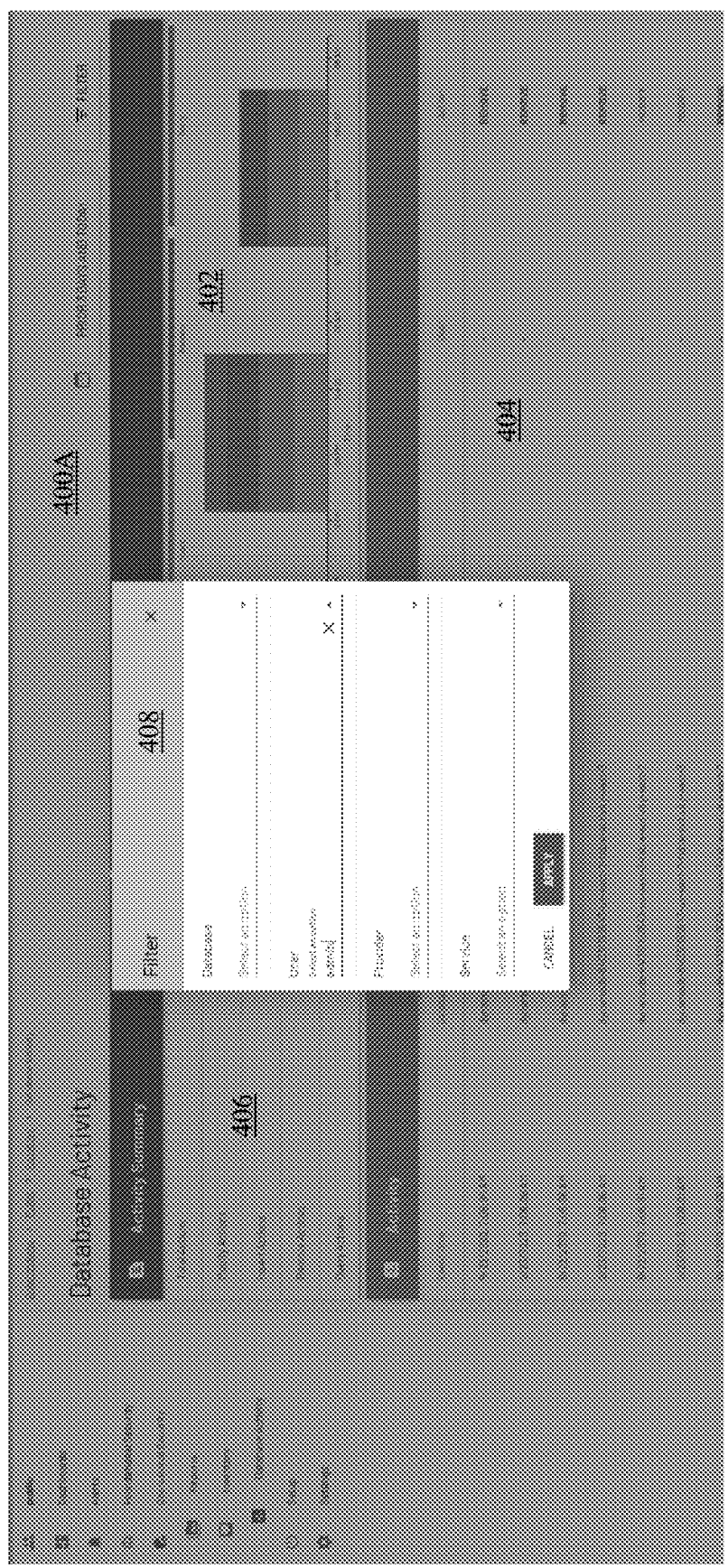

In this particular example, the activity breakdown 404 includes the user, action type, database identifier, and event time associated with particular actions (e.g., as imitated by the user device(s)). Additionally, the interactive dashboard 400A includes an activity summary 406 with totals for the actions and associated types that are illustrated in the histogram 402. In FIG. 4B, an overlay 408 is provided as a result of an interaction with the interactive dashboard 400A. The overlay 408 illustrates exemplary filters that can be applied to the activity data output via the interactive dashboard 400A, including particular users, providers or cloud network hosts, and services. Accordingly, the activity data can be filtered based on any parameter (e.g., corresponding to a column in the activity data repository 44) by which the normalized activity data is stored, and the reporting timeframe can also be specified.

Figure 4C:
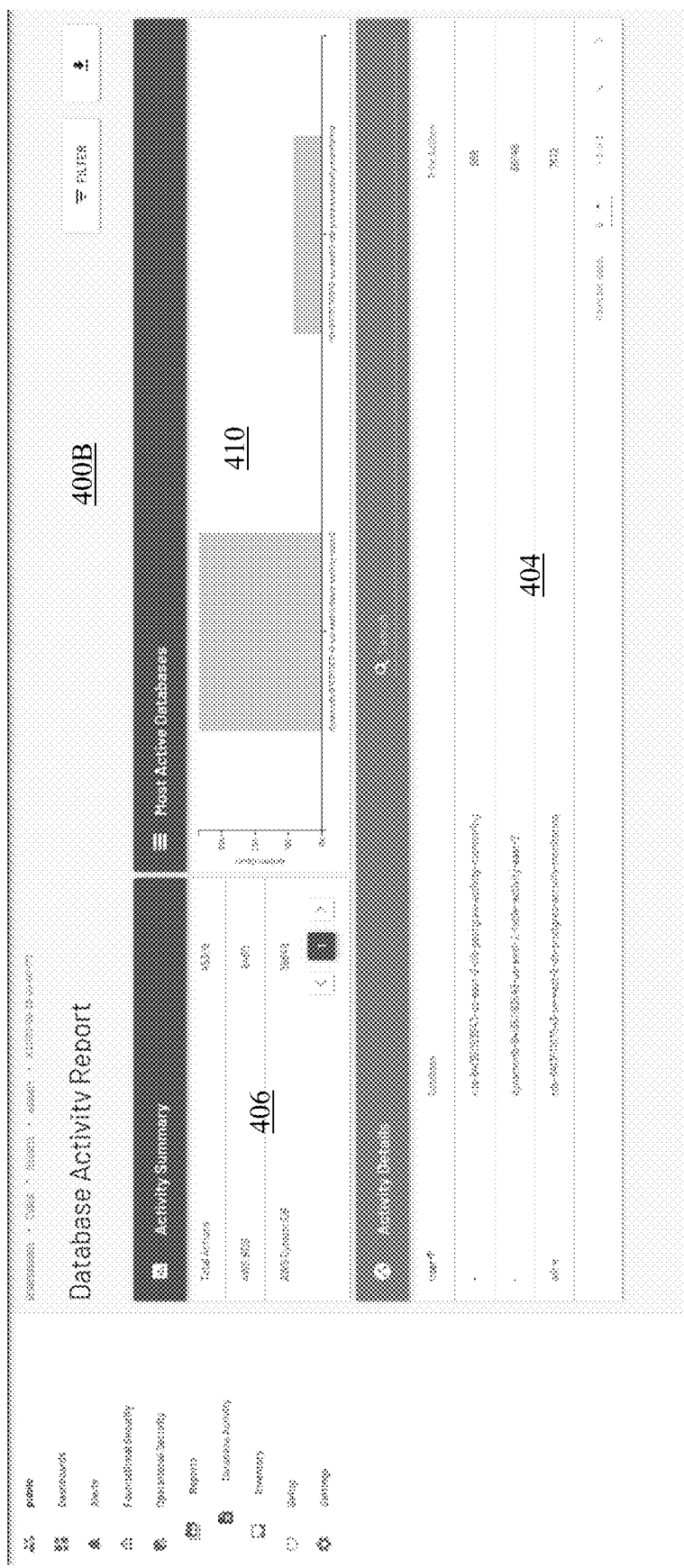
Figure 4D:
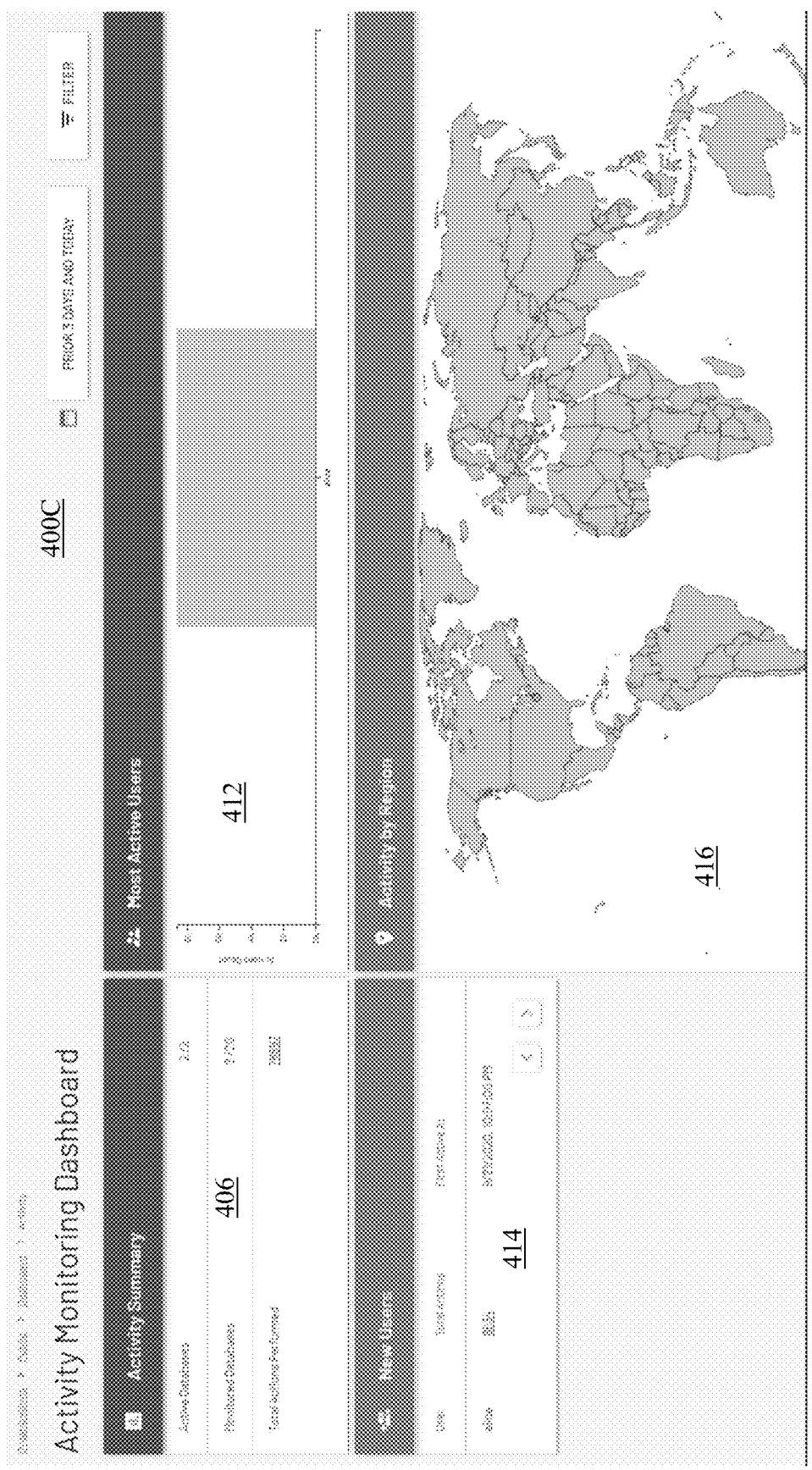

In the interactive dashboard 400B illustrated in FIG. 4C, the histogram 402 is replaced with an database action count bar graph 410 that identifies the most active ones of the databases 16(1)-16(n) by unique database identifier and the total number of actions reported in the stored activity data that are associated with the respective ones of the databases 16(1)-16(n). In the exemplary interactive dashboard 400C of FIG. 4D, the database action count bar graph 410 is replaced with a user action count bar graph 412 that identifies the most active ones of the users (e.g., of the user device(s) 28). The interactive dashboard 400C also includes an indication of new users 414 that have been active within a specified prior time period. Additionally, a map 416 is provided within the interactive dashboard 400C that includes a graphical indication of the geographical origin of a particular subset of the activity initiated with respect to one or more of the databases 16(1)-16(n).

In other examples, other types of information can be included on an interactive dashboard. Additionally, other types of reports can be generated according to any criteria preconfigured or provided by a user of the security administrator device 24, for example. Advantageously, the normalized activity data can represent activity across multiple database types, data models, services, and cloud provider hosts, for example, associated with the storage topology for an entity, and a user of the security administrator device 24 is therefore able to obtain and analyze a holistic view of the database activity that is monitored across the storage topology. Referring back to FIG. 3, subsequent to step 320, or if the DAM device 12 determines that reporting has not been requested and the No branch is taken from step 318, then the DAM device 12 proceeds to step 322.

In step 322, the DAM device 12, determines whether a configuration change has been requested, such as by a user of the security administrator device 24, for example. The configuration change 322 can relate to enabling activity monitoring for particular ones of the databases 16(1)-16(n), configuration data, such as key names or values, or any other operational parameters relating to the monitoring proxy 18, for example. If the DAM device 12 determines that a configuration change has been requested and is required, then the Yes branch is taken to step 324.

Figure 5:
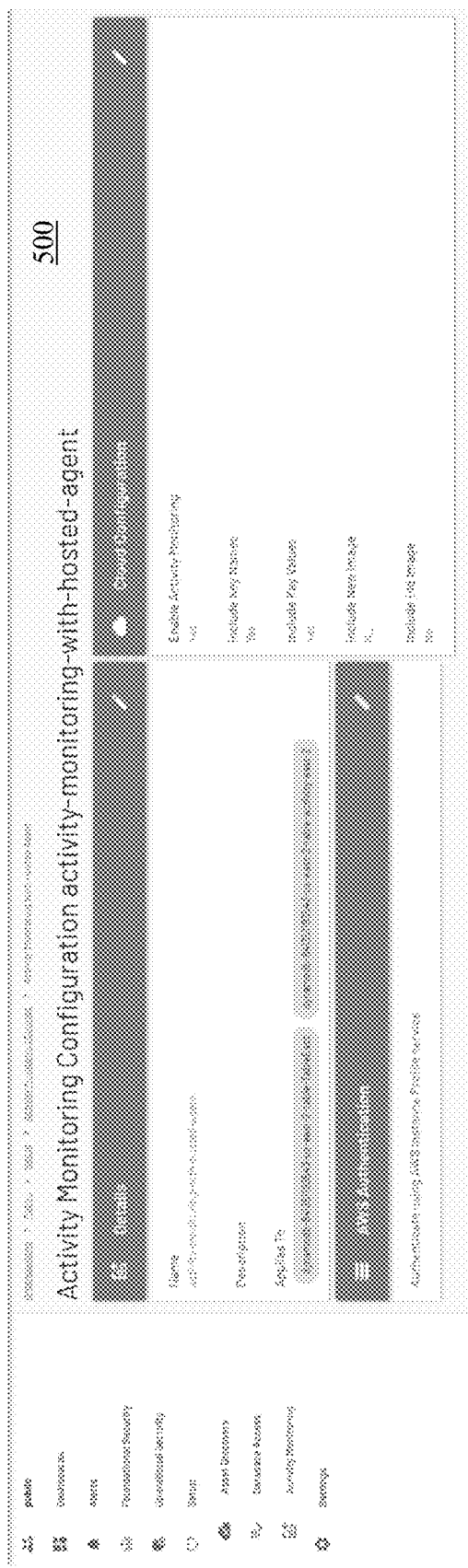
FIG. 5 is a screenshot of an interface for configuring a monitoring proxy deployed in virtual private cloud (VPC) network and configured to obtain and report activity data.

In step 324, the DAM device 12 reconfigures the monitoring proxy 18 based on the obtained configurations change(s). Referring to FIG. 5, a screenshot of a configuration interface 500 for configuring the monitoring proxy 18 deployed in the VPC network 20 is illustrated. In this example, the configuration interface 500 can be used to change the cloud configuration for one of the databases 16(1)-16(n), details relating to the one of the databases 16(1)-16(n), and authentication methods for the one of the databases 16(1)-16(n), although other types of configurations can also be established via the configuration interface 500 in other examples. Based on obtained configuration change(s), the DAM device 12 can communicate with the monitoring proxy 18 to adjust the corresponding operational parameters, such as described and illustrated in more detail above with reference to step 306 and with respect to a newly-detected one of the databases 16(1)-16(n).

Subsequent to step 324, or if the DAM device 12 determines that a configuration change is not required and the No branch is taken from step 322, then the DAM device 12 proceeds back to step 300 in this example. In other examples, one or more of steps 300-324 can be performed by the DAM device 12 in a different order and/or in parallel with one or more other of steps 300-324.

Figure 6:
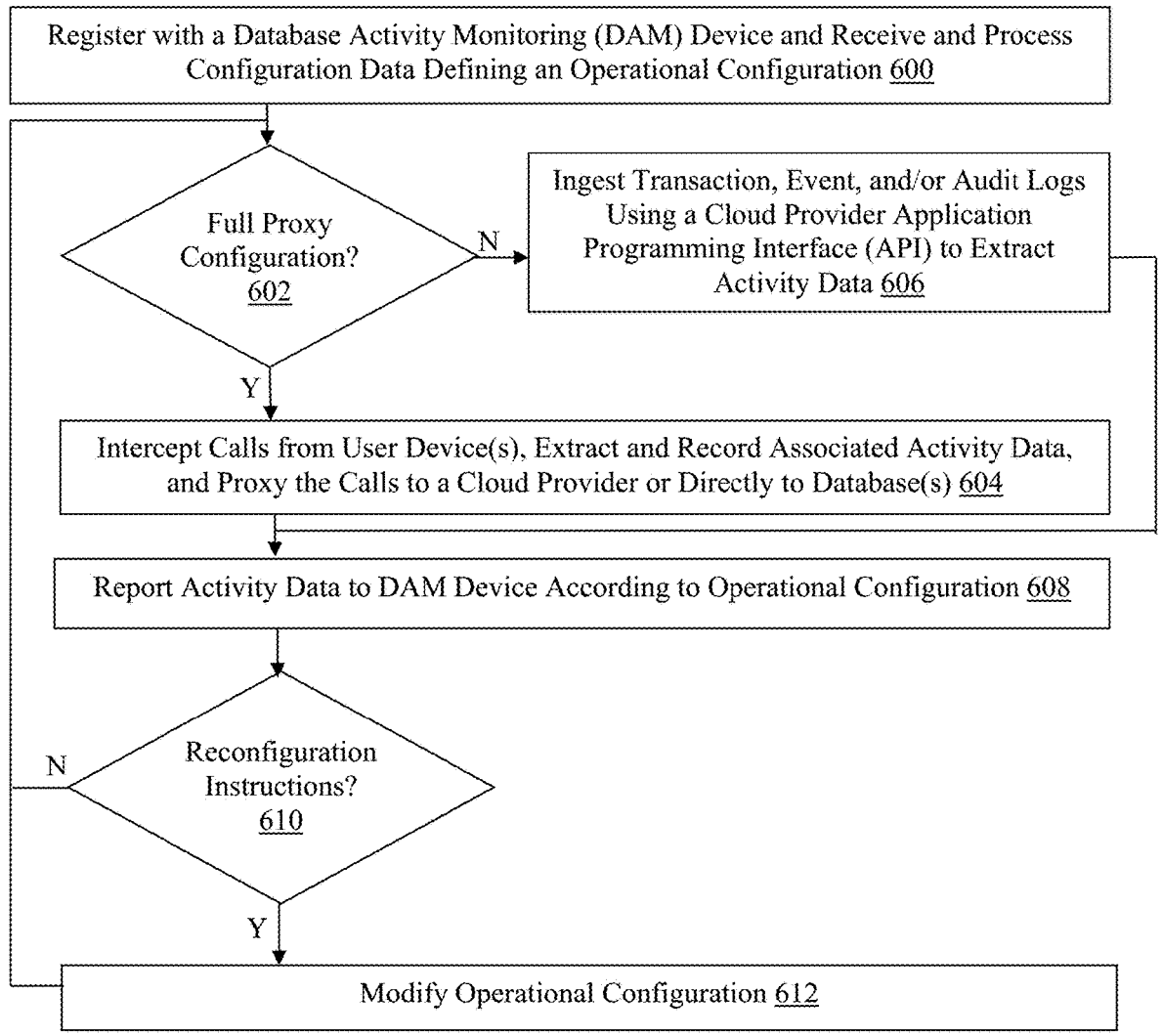
FIG. 6 is a flowchart of an exemplary method for monitoring public cloud database activity with a monitoring proxy deployed in a VPC network.

Referring more specifically to FIG. 6, an example of a method of monitoring public cloud database activity with the monitoring proxy 18 deployed in the VPC network 20 is illustrated. In step 600 in this example, the monitoring proxy 18 registers with the DAM device 12 and receive and processes configuration data defining the operational configuration and parameters of the monitoring proxy 18. The monitoring proxy 18 could have been deployed by the DAM device 12 as described and illustrated in more detail above with reference to step 304 of FIG. 3, for example.

Accordingly, the monitoring proxy communicates with the DAM device 12 as part of the registration process to obtain configuration data that at least establishes configuration data and the parameters for the activity data the monitoring process is to obtain and report to the DAM device 12. The configuration data can include what host names to use, what domain name service (DNS) names to use, and additional ports that should be opened, among other information.

In some examples, the monitoring proxy 18 can be configured to obtain a certificate that allows the monitoring proxy 18 to use a plurality of host names, and to establish a host name for each of the backend databases 16(1)-16(n). The configuration data also can include parameters of the databases, such as a type of one or more of the databases 16(1)-16(n), and/or of the activity data to be obtained, such as a time, action type, user identification, and database identification, for example, for particular actions.

In step 602, the monitoring proxy 18 determines whether it is operating based on a full proxy configuration requiring interception of calls to the databases 16(1)-16(n) or the host of the cloud provider network 22 in order to extract activity data. The determination in step 602 can be determined based on an explicit configuration in the configuration data, a type of each of the databases 16(1)-16(n) within the parameters of the configuration data, and/or one or more identified tags or characteristics of one or more of the databases 16(1)-16

(*n*), for example, although the determination can also be made in other ways in other examples. If the monitoring proxy 18 determines that it is operating based on a full proxy configuration, then the Yes branch is taken to step 604.

In step 604, the monitoring proxy 18 intercepts calls from the user device(s) 28, for example, extracts and records associated configuration data, and proxies the calls to the host of the cloud provider network 22 or directly to the databases **16(1)-16(*n*). Accordingly, in the full proxy configuration, the monitoring proxy intercepts TCP/HTTPS API call traffic and analyzes the traffic to identify parameters of the corresponding activity. However, if the DAM device 12 determines in step 602 that it has not been configured as a full proxy, then the No branch is taken to step 606**.

In step 606, the monitoring proxy 18 ingests transaction, event, and/or audit logs using a cloud provider API in order to extract activity data. Accordingly, the monitoring proxy 18 with this configuration for one or more of the databases **16(1)-16(*n*) is configured to query an API of a host of the cloud provider network 22 to obtain log(s), and analyze the log(s) to extract activity data according to the configuration data and associated parameters. Subsequent to steps 604 or 606, the monitoring proxy in this example proceeds to step 608**.

In step 608, the DAM device 12 reports the activity data generated in step 606 and/or 608 to the DAM device 12 according to the operational configuration. Accordingly, the monitoring proxy 18 obtains and/or filters the activity data according to the operational configurations and reports the resulting data to the DAM device 12, which can receive the reported activity data as described and illustrated in more detail above with reference to steps 310-312 of FIG. 3.

In some examples, the activity data can include information regarding queries to the databases **16(1)-16(*n*), connections to the databases 16(1)-16(*n*), administrative actions initiated with respect to the databases 16(1)-16(*n*), and/or processes internal to the databases 16(1)-16(*n*), for example, and other types of activity data can also be reported in step 608 in other examples. Irrespective of whether the monitoring proxy 18 is operating in a full proxy configuration, the monitoring proxy 18 can be configured to analyze tags or other characteristics of the databases 16(1)-16(*n*) based on an established policy or configuration, for example, to automatically determine whether activity associated with one or more of the databases 16(1)-16(*n*) should be monitored, and/or the parameters of the monitoring, as described and illustrated in more detail above with respect to newly-detected ones of the databases 16(1)-16(*n*) and step 300 of FIG. 3**.

In step 610, the monitoring proxy 18 determines whether reconfiguration instructions have been received, such as from the DAM device 12 in response to a configuration change received from the security administrator device 24, as described and illustrated above with reference to steps 306 and 324, for example. If the monitoring proxy 18 determines that reconfiguration instructions have been received, then the Yes branch is taken to step 612.

In step 612, the monitoring proxy 18 modified an operational configuration based on the reconfiguration instructions. For example, the monitoring proxy can update a list of monitored ones of the databases **16(1)-16(*n*) or obtain and report activity data corresponding to a new parameter, for example, although any other type of reconfiguration can also be performed in step 612. Subsequent to step 612, or if the monitoring proxy 18 determines that reconfiguration instructions have not been received and the No branch is taken from step 610, then the monitoring proxy proceeds back to step 602** in this example.

In other examples, one or more of steps 602-612 can be performed in a different order or in parallel with one or more other of steps 602-612. In particular, steps 604 and 606 could be performed by the monitoring proxy 18 with respect to the same one or more of the databases **16(1)-16(*n*), in examples in which analyzing API call traffic and log(s) are both used to obtain activity data, and/or with respect to different ones of the databases 16(1)-16(*n*)** optionally of a different database type. Other permutations can also be used in other examples.

With this technology, activity initiated with respect to public cloud databases associated with an entity, which may be deployed across cloud providers in a heterogeneous storage topology, can advantageously be monitored, analyzed with respect to security breaches or other defined alerts, and reported to administrators. This technology advantageously utilizes monitoring proxies deployed within VPC networks to obtain activity data and reduce the exposure of the monitored databases. Additionally, this technology provides administrators with a holistic and historical view of activity associated with the storage infrastructure for an entity as well as the ability to identify and address potential security violations.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for public cloud database activity monitoring implemented by a database activity monitor device, the method comprising:

deploying a monitoring proxy into a virtual private cloud (VPC) network hosted by a first public cloud network following detection in the VPC network of a new database associated with an entity;

receiving activity data from the monitoring proxy and recording the activity data in a repository, wherein the monitoring proxy is configured to obtain and report the activity data based on a first database type of the new database;

determining when at least one security check defined in at least one security policy is violated based on an analysis of the activity data;

automatically outputting an alert via a communication network, when the determination indicates the security check is violated; and generating and outputting one or more interactive dashboards based on the activity data, wherein the interactive dashboards comprise a historical database activity report for the entity.

2. The method of claim 1, further comprising normalizing the activity data with other activity data obtained for one or more other databases associated with the entity, wherein the other databases are:

deployed in a second public cloud network that is different than the first public cloud network and is hosted by a first provider that is different than a second provider of the first public cloud network; and of a second database type that is different than the first database type.

3. The method of claim 1, wherein the monitoring proxy is further configured to extract one or more logs via an application programming interface (API) provided by a host of the first public cloud network, wherein the logs comprise at least a portion of the activity data.

4. The method of claim 1, wherein the monitoring proxy is further configured to:

intercept a plurality of application programming interface (API) calls to the new database or a host of the first public cloud network, wherein the API calls are from one or more client devices associated with users or administrators of the new database;

record at least a portion of the activity data based on other information extracted from the intercepted API calls; and forward the API calls to initiate one or more interactions associated with the activity data.

5. The method of claim 1, further comprising:

executing at least one of a cloud formation template or a script to instantiate a container in the VPC network that executes the monitoring proxy; and providing configuration data to the monitoring proxy following execution and registration of the monitoring proxy, wherein the configuration data defines an operational configuration of the monitoring proxy including parameters of the activity data.

6. The method of claim 1, wherein the monitoring proxy is further configured to:

identify one or more tags associated with the new database; and apply one or more rules based on the tags, wherein the rules define one or more triggers for alerting or one or more parameters for the activity data that is reported.

7. The method of claim 1, wherein the activity data comprises information regarding queries to the new database, connections to the new database, administrative actions initiated with respect to the new database, or processes internal to the new database.

8. The method of claim 1, wherein the monitoring proxy is further configured to restrict an interaction initiated against the new database when one or more characteristics of the interaction match a stored pattern indicative of a malicious or unauthorized interaction.

9. A database activity monitor device, comprising memory comprising programmed instructions stored thereon and one or more processors configured to execute the stored programmed instructions to:

deploy a monitoring proxy into a virtual private cloud (VPC) network hosted by a first public cloud network following detection in the VPC network of a new database associated with an entity;

receive activity data from the monitoring proxy and record the activity data in a repository, wherein the monitoring proxy is configured to obtain and report the activity data based on a first database type of the new database;

determine when at least one security check defined in at least one security policy is violated based on an analysis of the activity data;

automatically output an alert via a communication network, when the determination indicates the security check is violated; and generate and output one or more interactive dashboards based on the activity data, wherein the interactive dashboards comprise a historical database activity report for the entity.

10. The database activity monitor device of claim 9, wherein the processors are further configured to execute the stored programmed instructions to normalize the activity data with other activity data obtained for one or more other databases associated with the entity, wherein the other databases are:

deployed in a second public cloud network that is different than the first public cloud network and is hosted by a first provider that is different than a second provider of the first public cloud network; and of a second database type that is different than the first database type.

11. The database activity monitor device of claim 9, wherein the monitoring proxy is further configured to extract one or more logs via an application programming interface (API) provided by a host of the first public cloud network, wherein the logs comprise at least a portion of the activity data.

12. The database activity monitor device of claim 9, wherein the monitoring proxy is further configured to:

intercept a plurality of application programming interface (API) calls to the new database or a host of the first public cloud network, wherein the API calls are from one or more client devices associated with users or administrators of the new database;

record at least a portion of the activity data based on other information extracted from the intercepted API calls; and forward the API calls to initiate one or more interactions associated with the activity data.

13. The database activity monitor device of claim 9, wherein the processors are further configured to execute the stored programmed instructions to:

execute at least one of a cloud formation template or a script to instantiate a container in the VPC network that executes the monitoring proxy; and provide configuration data to the monitoring proxy following execution and registration of the monitoring proxy, wherein the configuration data defines an operational configuration of the monitoring proxy including parameters of the activity data.

14. The database activity monitor device of claim 9, wherein the monitoring proxy is further configured to:

identify one or more tags associated with the new database; and apply one or more rules based on the tags, wherein the rules define one or more triggers for alerting or one or more parameters for the activity data that is reported.

15. The database activity monitor device of claim 9, wherein the activity data comprises information regarding queries to the new database, connections to the new database, administrative actions initiated with respect to the new database, or processes internal to the new database.

16. The database activity monitor device of claim 9, wherein the monitoring proxy is further configured to restrict an interaction initiated against the new database when one or more characteristics of the interaction match a stored pattern indicative of a malicious or unauthorized interaction.

17. A non-transitory computer readable medium having stored thereon instructions for public cloud database activity monitoring comprising executable code that, when executed by one or more processors, causes the processors to:
- deploy a monitoring proxy into a virtual private cloud (VPC) network hosted by a first public cloud network following detection in the VPC network of a new database associated with an entity;
- receive activity data from the monitoring proxy and record the activity data in a repository, wherein the monitoring proxy is configured to obtain and report the activity data based on a first database type of the new database;
- determine when at least one security check defined in at least one security policy is violated based on an analysis of the activity data;
- automatically output an alert via a communication network, when the determination indicates the security check is violated; and
- generate and output one or more interactive dashboards based on the activity data, wherein the interactive dashboards comprise a historical database activity report for the entity.

18. The non-transitory computer readable medium of claim 17, wherein the executable code, when executed by the processors, further causes the processors to normalize the activity data with other activity data obtained for one or more other databases associated with the entity, wherein the other databases are:
- deployed in a second public cloud network that is different than the first public cloud network and is hosted by a first provider that is different than a second provider of the first public cloud network; and
- of a second database type that is different than the first database type.

19. The non-transitory computer readable medium of claim 17, wherein the monitoring proxy is further configured to extract one or more logs via an application programming interface (API) provided by a host of the first public cloud network, wherein the logs comprise at least a portion of the activity data.

20. The non-transitory computer readable medium of claim 17, wherein the monitoring proxy is further configured to:
- intercept a plurality of application programming interface (API) calls to the new database or a host of the first public cloud network, wherein the API calls are from one or more client devices associated with users or administrators of the new database;
- record at least a portion of the activity data based on other information extracted from the intercepted API calls; and
- forward the API calls to initiate one or more interactions associated with the activity data.

21. The non-transitory computer readable medium of claim 17, wherein the executable code, when executed by the processors, further causes the processors to:
- execute at least one of a cloud formation template or a script to instantiate a container in the VPC network that executes the monitoring proxy; and
- provide configuration data to the monitoring proxy following execution and registration of the monitoring proxy, wherein the configuration data defines an operational configuration of the monitoring proxy including parameters of the activity data.

22. The non-transitory computer readable medium of claim 17, wherein the monitoring proxy is further configured to:
- identify one or more tags associated with the new database; and
- apply one or more rules based on the tags, wherein the rules define one or more triggers for alerting or one or more parameters for the activity data that is reported.

23. The non-transitory computer readable medium of claim 17, wherein the activity data comprises information regarding queries to the new database, connections to the new database, administrative actions initiated with respect to the new database, or processes internal to the new database.

24. The non-transitory computer readable medium of claim 17, wherein the monitoring proxy is further configured to restrict an interaction initiated against the new database when one or more characteristics of the interaction match a stored pattern indicative of a malicious or unauthorized interaction.

* * * * *